(12) United States Patent
Jack et al.

(10) Patent No.: US 7,831,205 B2
(45) Date of Patent: Nov. 9, 2010

(54) METHODS AND SYSTEMS FOR WIRELESS COMMUNICATION BY MAGNETIC INDUCTION

(75) Inventors: Nathan Jack, Boise, ID (US); Krishna Shenai, Logan, UT (US)

(73) Assignee: Utah State University, North Logan, UT (US)

( * ) Notice: Subject to any disclaimer, the term of this patent is extended or adjusted under 35 U.S.C. 154(b) by 606 days.

(21) Appl. No.: 11/763,961

(22) Filed: Jun. 15, 2007

(65) Prior Publication Data

US 2008/0171512 A1 Jul. 17, 2008

Related U.S. Application Data

(60) Provisional application No. 60/880,854, filed on Jan. 16, 2007.

(51) Int. Cl.
*H04B 13/02* (2006.01)

(52) U.S. Cl. .................. 455/40; 455/41.1; 455/41.2; 455/457; 455/72; 324/674; 324/335; 324/452; 324/67; 324/671; 136/224; 136/246; 136/255; 136/263; 250/307; 166/248; 166/258; 166/261

(58) Field of Classification Search ............... 455/41.1, 455/40, 41.2; 324/3, 6, 452, 457, 67, 662, 324/671, 674, 335, 72; 166/248, 64, 261, 166/258; 136/244, 246, 255, 263; 250/307; 331/40, 25, 37; 365/66, 226, 52

See application file for complete search history.

(56) References Cited

U.S. PATENT DOCUMENTS

| | | | |
|---|---|---|---|
| 3,936,728 A * | 2/1976 | Ghosh et al. ............... 324/335 |
| 4,344,483 A * | 8/1982 | Fisher et al. ............... 166/248 |
| 4,866,616 A * | 9/1989 | Takeuchi et al. ........... 701/35 |
| 4,953,123 A * | 8/1990 | Takeuchi et al. ........... 365/66 |
| 5,771,438 A | 6/1998 | Palermo et al. |
| 6,028,522 A | 2/2000 | Petite |
| 6,134,420 A | 10/2000 | Flowerdew et al. |
| 6,218,953 B1 | 4/2001 | Petite |
| 6,219,529 B1 | 4/2001 | Kimura et al. |
| 6,424,820 B1 | 7/2002 | Burdick et al. |

(Continued)

OTHER PUBLICATIONS

M. Ghovanloo, K. Najafi, A Fully Digital Frequency Shift Keying Demodulator Chip for Wireless Biomedical Implants, IEEE 0-7803-7778, Aug. 2003.

(Continued)

*Primary Examiner*—Matthew D Anderson
*Assistant Examiner*—April G Gonzales

(57) ABSTRACT

Disclosed are embodiments of methods and systems for wireless data transmission by magnetic induction. In one embodiment, a network of magnetic induction units is provided. The units may be configured to transmit a data signal by modulation of a time-varying magnetic field. One or more units may also be configured to receive a data signal received from another magnetic induction unit. In one specific implementation, a network of underground magnetic induction units is provided, each having a sensor connected thereto. Each of the units, or a subset of the units, may be configured to transmit its sensed data to an adjacent or nearby unit, which, in turn, may retransmit the original data, along with additional appended data, to another adjacent unit. The network data may thereby be relayed in a multi-hop fashion until it reaches a desired destination.

28 Claims, 5 Drawing Sheets

U.S. PATENT DOCUMENTS

| | | | |
|---|---|---|---|
| 6,437,692 B1 | 8/2002 | Petite et al. | |
| 6,459,882 B1 | 10/2002 | Palermo et al. | |
| 6,796,187 B2 | 9/2004 | Srinivasan et al. | |
| 6,960,962 B2* | 11/2005 | Peterzell et al. | 331/40 |
| 6,975,245 B1 | 12/2005 | Slater et al. | |
| 7,015,859 B2 | 3/2006 | Anderson | |
| 7,103,511 B2 | 9/2006 | Petite | |
| 7,330,032 B2* | 2/2008 | Donnangelo | 324/452 |
| 2005/0167588 A1* | 8/2005 | Donnangelo | 250/307 |
| 2005/0257827 A1* | 11/2005 | Gaudiana et al. | 136/263 |
| 2005/0268962 A1* | 12/2005 | Gaudiana et al. | 136/255 |
| 2006/0076048 A1* | 4/2006 | Gaudiana et al. | 136/246 |
| 2007/0012349 A1* | 1/2007 | Gaudiana et al. | 136/244 |
| 2008/0122424 A1* | 5/2008 | Zhang et al. | 324/72 |
| 2009/0222921 A1* | 9/2009 | Mukhopadhyay et al. | 726/23 |

OTHER PUBLICATIONS

Aura, "Near-Field Magnetic Communication Properties," AWP0001.1 Aura Communications, Inc., pp. 1-5, 2003. www.auracomm.com.

Ian F. Akyildiz et al., Wireless Underground Sensor Networks: Research Challenges, Elsevier, AD Hoc Networks, ScienceDirect, pp. 669-686, 2006. www.sciencedirect.com.

* cited by examiner

METHODS AND SYSTEMS FOR WIRELESS COMMUNICATION BY MAGNETIC INDUCTION

RELATED APPLICATIONS

This application claims the benefit under 35 U.S.C. §119 (e) of U.S. Provisional Patent Application No. 60/880,854, filed Jan. 16, 2007, and titled "Magnetic Induction Communication System for Underground Wireless Sensor Networks," which is incorporated herein by specific reference.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF PREFERRED EMBODIMENTS

Figure 1:
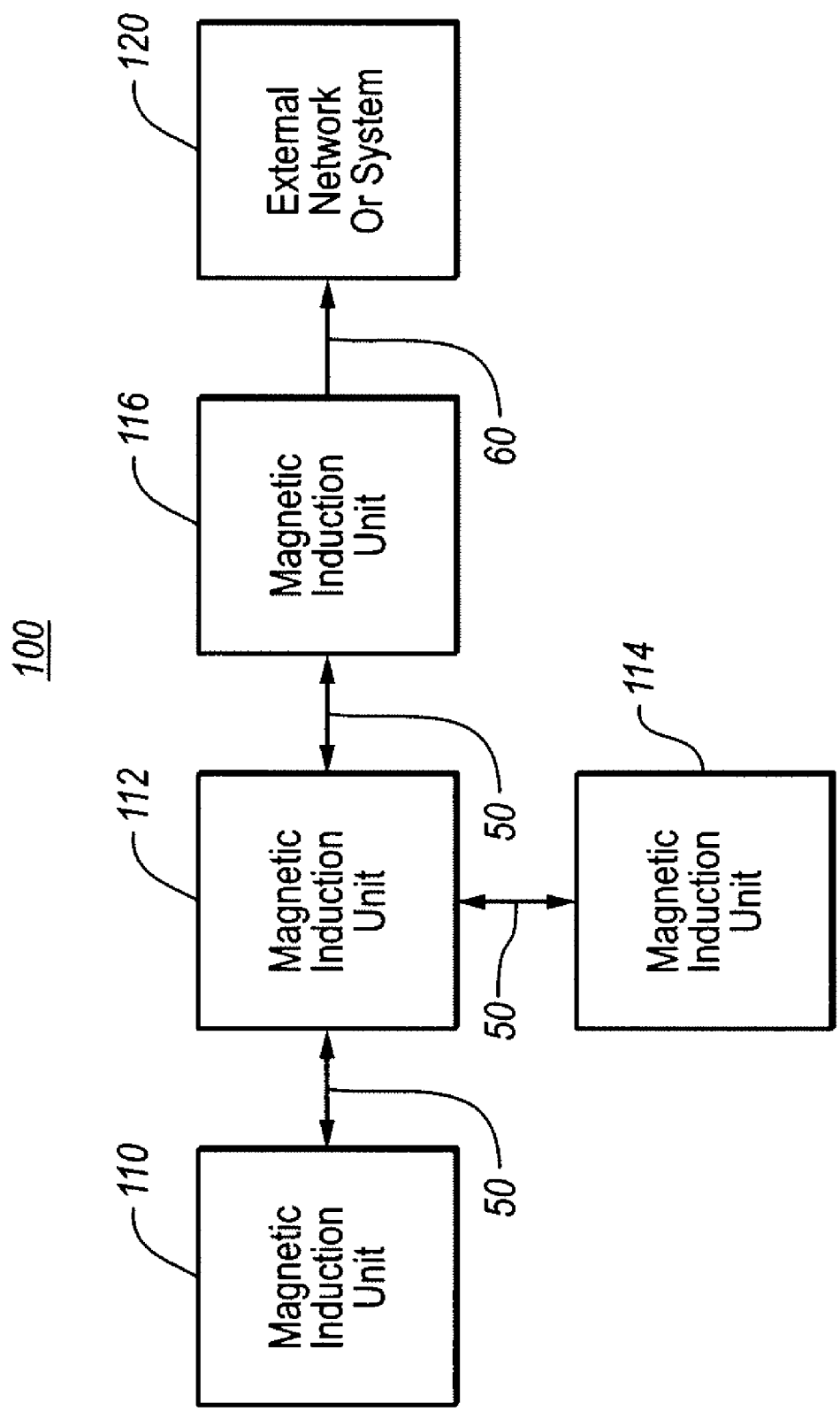
FIG. 1 is a block diagram of one example of a network of magnetic induction devices connected to an external network or device according to one implementation of the invention.

In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments.

Disclosed are embodiments of methods and systems for wireless data transmission by magnetic induction. In one embodiment, a network of magnetic induction units is provided. The units may be configured to transmit a data signal by modulation of a time-varying magnetic field. In some embodiments, one or more of the magnetic inductions units may be configured for directional transmission of the data signal in a predetermined direction. Each unit may thereby be positioned such that it will receive a signal from an adjacent unit and such that it directs a signal to another particular adjacent unit.

More specifically, this may be accomplished by providing only a single ferromagnetic coil configured to transmit the data signal in a particular direction for each unit, thereby exploiting the directionality of the single coil by placing receiving units in the direction of transmission. In this manner, the receiving units receive the transmitted data but other devices or "eavesdroppers" oriented differently do not. Optionally, additional coils may be added to allow for multiple orientations of receiving units. These additional coils may be oriented in a variety of ways as required by the system. Thus, one or more of the magnetic induction units may comprise a first single ferromagnetic coil configured to transmit the data signal in a first direction and some may also further comprise a second single ferromagnetic coil configured to transmit the data signal in a second direction. Each of the magnetic induction units may transmit a variety of different data types using one-way or two-way magnetic induction communication.

One of the magnetic induction units may be designated as the "base unit." The base unit may be configured to receive and/or demodulate one or more data signals from another unit or units. In some embodiments, the base unit may be configured to receive data from each of the other units in the network, or within a subnetwork. The base unit may also, or alternatively, be configured for relaying data it has received from the units throughout the network to another system or network. In some implementations, this relay of data may be accomplished by using a secondary communication technology, such as RF or wired connection technology.

The data contained in the signal transmitted by one or more of the units may be obtained from one or more sensors configured to detect one or more variables. For example, a plurality of underground soil moisture content sensors may be provided. Data from the sensors in such an embodiment may be relayed underground from one unit to the next until it reaches a base unit, another network, or another such destination. In some embodiments, a first unit may be configured to transmit its data to a nearby second unit, which, in turn, transmits the data from the first unit, along with additional appended data from the second unit, to a third unit near to the second unit, but unreachable by the first unit, and so on. In this manner, the network data may be relayed in a multi-hop fashion until it reaches a desired destination. For some applications, a magnetic induction wireless sensor network may be configured to use a combination/hybrid of wireless communication technologies such as MI, RF, infrared, or wired connections, to achieve communication between network units.

Of course, a variety of implementations are contemplated for relaying data between units. For example, assume a first magnetic induction unit is configured to transmit a data signal by modulation of a time-varying magnetic field, and a second magnetic induction unit is configured to receive the data signal from the first magnetic induction unit, and then transmit a second data signal. The second data signal may solely comprise data received from the first data signal. A third data signal may then be transmitted from the second magnetic induction unit with data received from sensor associated with the second magnetic induction unit. Alternatively, the second data signal may further comprise appended data received from the other sensor. Accordingly, a second modulated magnetic carrier signal generated from the second magnetic induction unit may be a modulation of a first modulated magnetic carrier signal received from a first magnetic induction unit or the second modulated magnetic carrier signal may solely comprise data generated at the node/sensor corresponding to the second magnetic induction unit. In other words, the units may be configured to pass data along from previous units in separate signals, apart from the signals with their own data, or they may be configured to modify the signal received from a previous unit with appended data corresponding to their respective sensors.

In some preferred embodiments, one or more of the units in the network may be configured with an onboard power source. This may allow the units to transmit event-specific data when it occurs, and may also eliminate the need to pass over the units with a reader, which often expends high amounts of energy. The short transmission distance of magnetic induction units with smaller power sources may be compensated for by the ability of each unit to receive data from a nearby unit, optionally append additional data of its own, and retransmit this data to another nearby unit unreachable by the first, in a multi-hopping fashion.

A variety of applications of various implementations of the invention are contemplated. For example, as discussed above, an underground wireless magnetic induction network may be provided for use in agriculture to control irrigation. In other implementations, an underground network of pressure, vibration, movement, audio, and/or other sensors may be provided for a defense and/or monitoring system, which may have military applications. In still other implementations, an underwater network of sensors may be provided to monitor water properties or quantity, plant and/or animal life, or living conditions in a particular portion or region of the underwater environment. As another potential application, a network of implanted biomedical sensors may be provided, which may be used to coordinate the acquisition of certain vital signs and/or biological conditions. Such a network configuration may be configured such that one sensor for detecting a particular problem or condition, such as, for example, a high fever or a heart condition, is used to trigger other sensors to acquire relevant data to assist in problem solving and/or decision making. Sensors may also be used to trigger actuation of one or more therapeutic mechanisms for alleviating the problem or condition. Countless other applications will become apparent to those of ordinary skill in the art, after receiving the benefit of this disclosure. For example, any application which calls for a wireless network through a non-gaseous medium (such as, for example, soil, rock, water, or biological matter), or in which short-range communication is desirable, may call for one or more of the inventive concepts disclosed herein. For example, a PDA, watch, cell phone, laptop, and/or PC may be configured to synchronize to one another if within a given transmission range.

With reference to the accompanying drawings, specific embodiments of the invention will now be described in greater detail. Reference is first made to FIG. 1. In FIG. 1, a magnetic induction network 100 is provided. Network 100 includes four adjacent magnetic induction units 110, 112, 114, and 116, each of which is configured for two-way wireless communication with at least one adjacent unit using magnetic induction (MI) 50 as the primary transmission method. It should be understood that other networks are contemplated in which one or more of the units or nodes are configured for one-way wireless communication only.

Because the communication range for magneto-inductive systems is relatively short, each of the units may transmit its data to an adjacent or nearby unit, which, in turn, may retransmit the data, along with additional appended data, to another adjacent unit unreachable by the first unit. The network data may be relayed in a multi-hop fashion until it reaches a desired destination. One or more of the units may be configured to receive data from multiple adjacent units. Indeed, as shown in FIG. 1, unit 112 is configured to receive data from units 110, 114, and 116. One unit may be designated as a base unit 116. Base unit 116 may be configured for receiving data from each of the units, or a subset of the units, in the network 100. Base unit 116 may also be configured to relay data to another network or system 120 using a secondary communication technology 60, such as radiofrequency, infrared, or wired electronic transmission.

For specific applications, a magnetic induction network can be configured in combination with other communication mechanisms. An example of such an implementation is shown in network 200 of FIG. 2. Network 200 includes a first sub-network 210 and a second sub-network 230. Sub-network 210 includes a plurality of sensing nodes 212, 214, 216, and 218. Sensing nodes 214, 216, and 218 are connected to one another via magnetic induction wireless connections 50. Communication between the various sensing nodes may be achieved through MI transmission, using, for example, the multi-hop method described previously.

Figure 2:
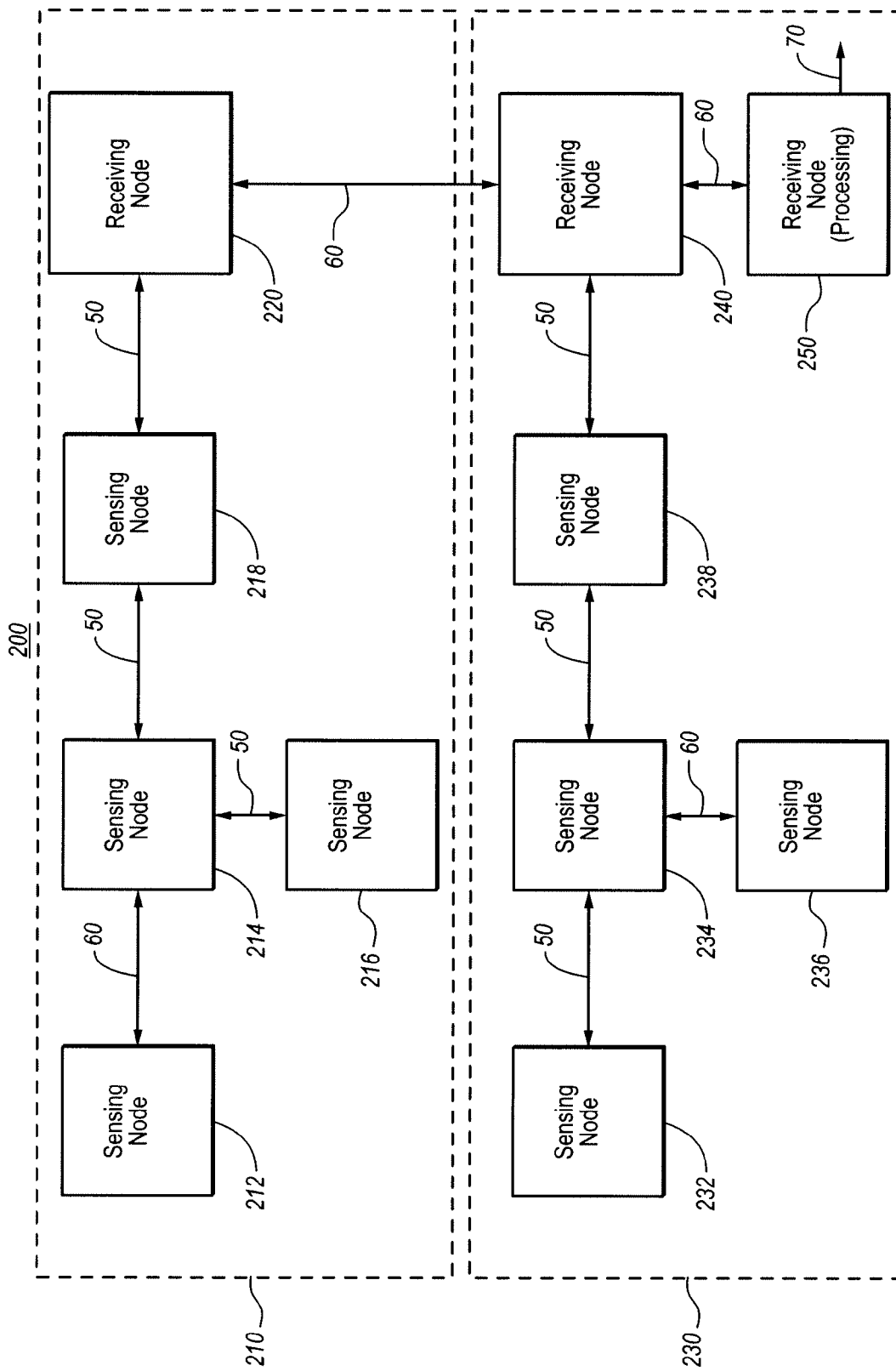
FIG. 2 is a block diagram of another example of a magnetic induction network using multiple transmission technologies to interconnect nodes and/or networks according to another implementation of the invention.

Additional sensor nodes may be added to the network through RF, cable, or other transmission technologies 60. Accordingly, FIG. 2 depicts node 212 connected to node 214 via a secondary communication technology 60. This may be beneficial if it is desirable to place a node far from the network, particularly at a distance where MI transmission is impractical or difficult. All sensory data may ultimately be relayed to a receiving node 220.

As demonstrated by FIG. 2, the network 200 may be subdivided into smaller networks 210 and 230, each containing a corresponding receiving node. These receiving nodes may communicate with each other via RF, infrared, cable, or other transmission methods 60. Thus, receiving node 220 of network 210 is connected to receiving node 240 of network 230 to create network 200. Like network 210, network 230 may include a plurality of sensing nodes 232, 234, 236, and 238, each of which are connected by MI 50 and/or secondary communications connections 60. Those of ordinary skill in the art will appreciate that any MI connection 50 described herein may be replaced with a secondary connection 60, and vice versa.

One or more receiving nodes may be designated as a master receiving node 250 where all information is gathered and processed. Optionally, master receiving node 250 may further be connected to a variety of other networks, devices, or systems as desired, as indicated by connection 70 in FIG. 2.

Figure 3:
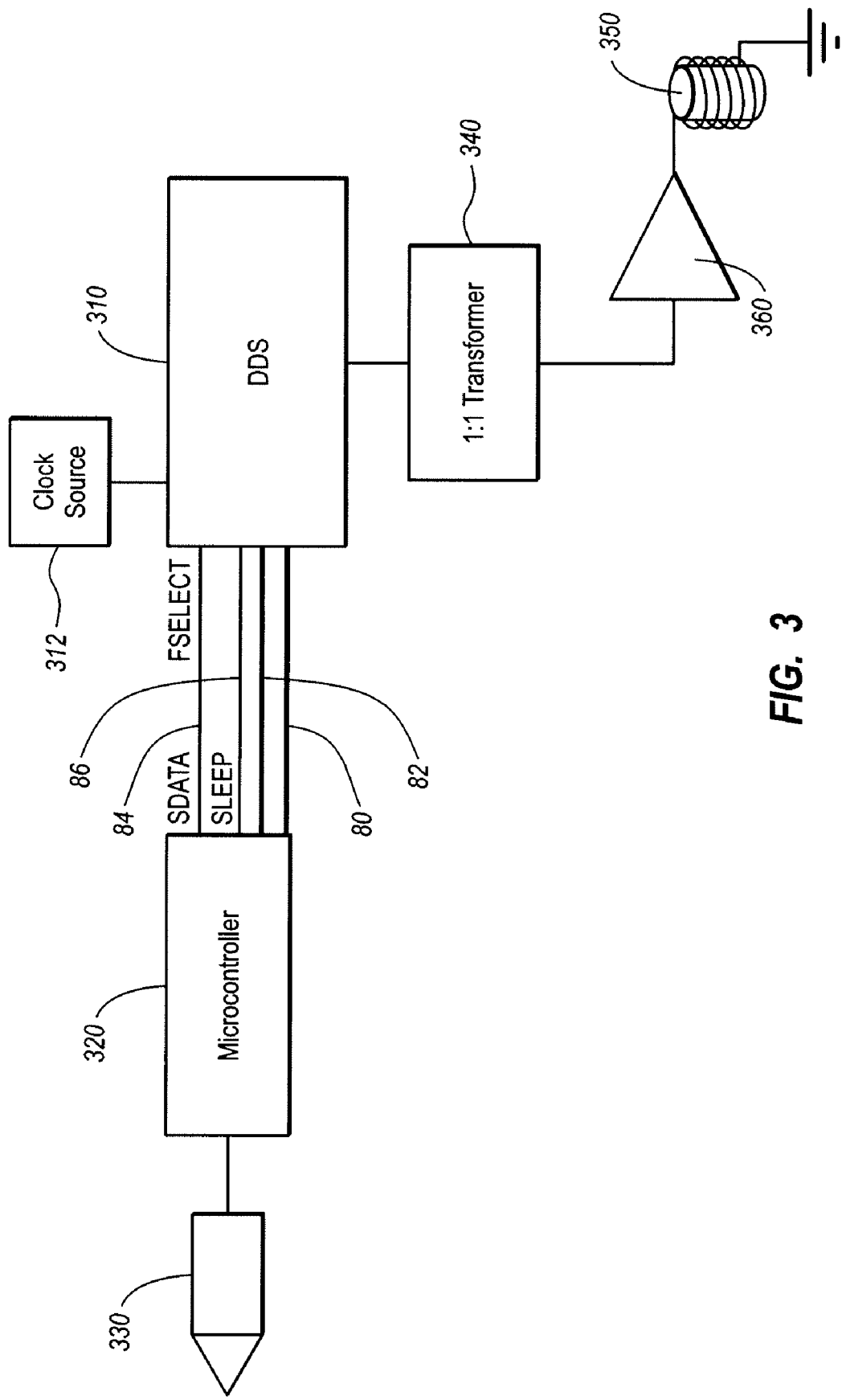
FIG. 3 is a block diagram of one example of a configuration for a magnetic induction transmitter suitable for use in connection with various embodiments of the invention.

An example circuit implementation for a digital transmitter is depicted in FIG. 3. FIG. 3 depicts a transmitter comprising a programmable direct digital synthesizer (DDS) 310, which may be used to generate two distinct transmitting frequencies used for binary modulation. DDS 310 can be, for example, an AD9834 device. In this embodiment, the DDS is programmed serially to oscillate at two distinct frequencies—the serial clock 80 and the serial data 82 frequencies. In some embodiments, the highest frequency which DDS 310 can successfully synthesize is 50% of the frequency of the clock signal supplied to it by clock source 312.

A microcontroller 320, such as, for example, the PIC12f675, may be used to program the DDS 310 and read the data obtained by one or more attached sensors 330, such as a soil moisture probe. The microcontroller 320 may contain an analog to digital converter (ADC), or an external ADC may be used, to convert analog sensory outputs to digital values. This digital sensory information may be transmitted serially to the DDS 310 on the serial data output (SDATA) pin of the microcontroller 320. The SDATA pin may be connected to the FSELECT pin on the DDS 310, as indicated at 84. Thus, when SDATA goes high, representing a "1", the DDS 310 oscillates at one frequency, while a "0" on the SDATA causes the DDS 310 to oscillate at the second frequency. In this way, binary frequency shift keying (BFSK) may be used to digitally transmit data. The microcontroller 320 may also be used for power management by controlling the power-down and "sleep" functions indicated at 86. Power may be supplied by batteries, such as two AAA cells, and may also be converted to the desired level using an appropriate converter.

The output of the DDS 310 may be sent through a 1:1 transformer 340 for isolation and to convert the unipolar signal output to a bipolar one, centered at 0V. A ferromagnetic coil 350 may be used as the transmitting antenna. Coil 350 may be connected to the transformer 340, where it receives the oscillating current and generates a corresponding time-varying magnetic field. An amplifier 360 may also be applied to coil 350, if necessary, to improve performance.

Figure 4:
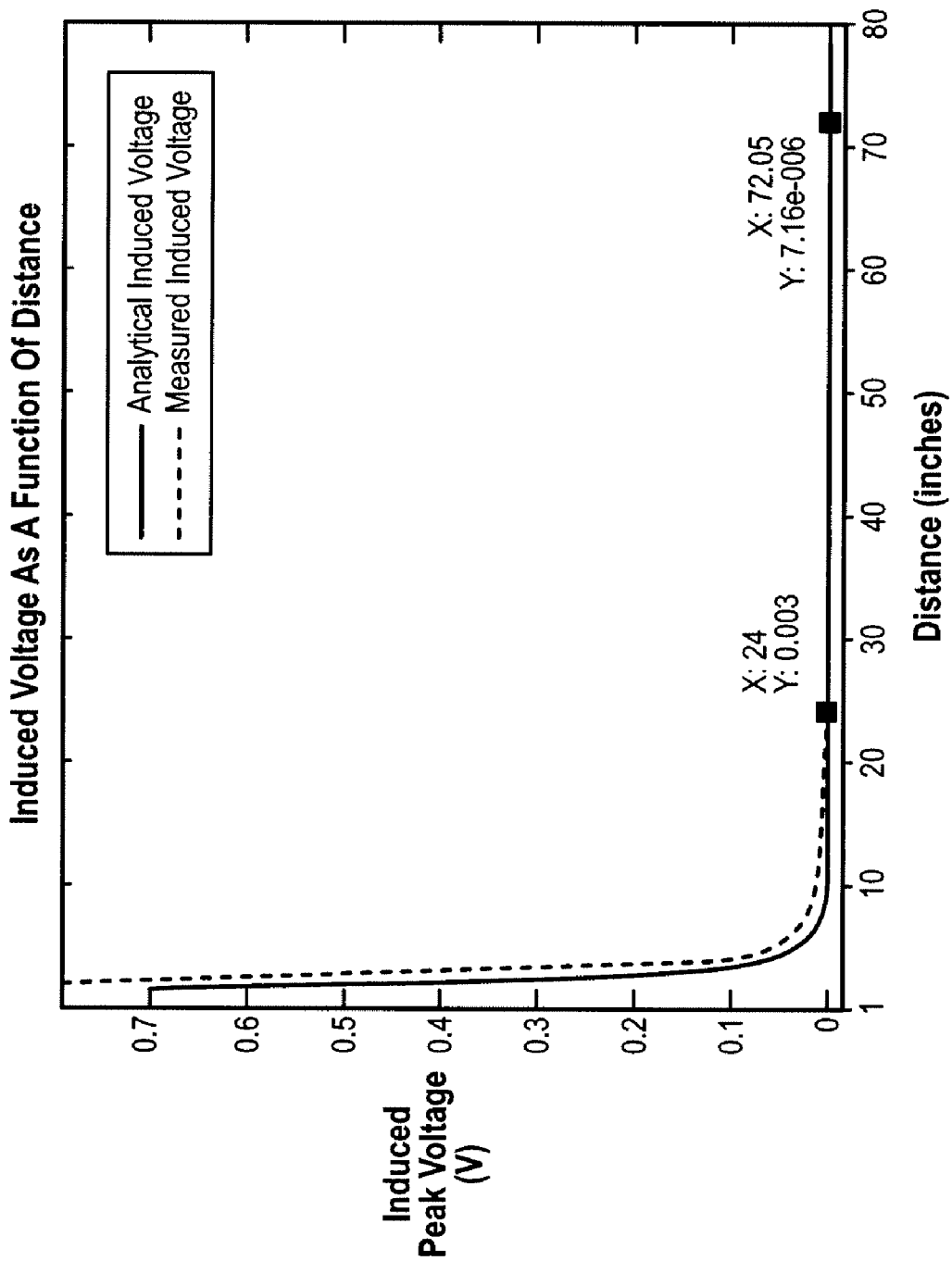
FIG. 4 is a graph depicting the measured and calculated induced voltage, under ideal conditions, as a function of distance for a prototype magnetic induction transmitter.

The graph of FIG. 4 depicts typical performance characteristics of the transmitter depicted in FIG. 3. This graph contains two curves, one of which depicts the predicted or analytical voltage received by the coil as a function of distance, and the other (dashed line) of which depicts the actual measured voltage induced in a receiving coil when disconnected from receiver circuitry.

As shown in the graph, the peak-to-peak voltage at a separation distance of 2 ft is about 3 mV, which may be detected and demodulated by a receiver. At a distance of 6 ft, a 7 µV signal is predicted, which may also be demodulated using sophisticated and commercially available demodulation components.

Figure 5:
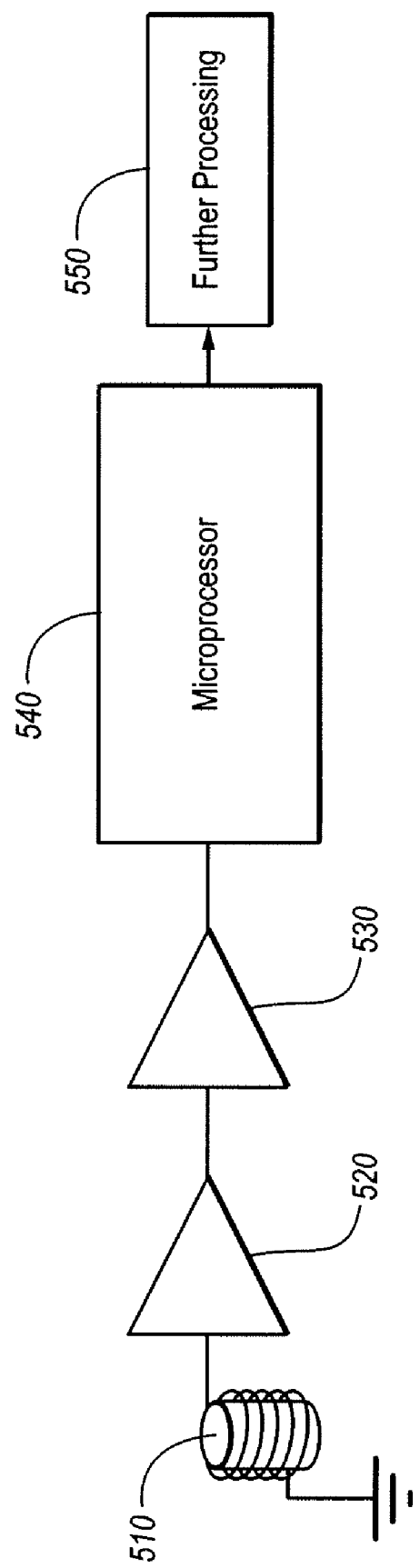
FIG. 5 is a block diagram of one example of a configuration for a magnetic induction receiver suitable for use in connection with various embodiments of the invention.

FIG. 5 illustrates one example of a receiver in which a ferromagnetic coil 510, similar to the coil 350 used in the transmitter of FIG. 3, is used to receive the signal. The received signal may pass through a low noise amplifier 520. Due to the large dynamic range of the input signal, which varies as a function of the separation distance, a variable gain amplifier 530 may also be used to amplify or attenuate the incoming signal as needed. The amplified signal may then be sent to a microprocessor 540 after being divided to a lower frequency, if so required by the microprocessor speed. Demodulation of the signal may be accomplished by counting the number of pulses in a given period of time and thereby determining the oscillating frequency. Counting may be done using a digital counter inside or external to the microprocessor. Once the frequency is determined, it may converted to a "1" or "0", as appropriate. The extracted data may then be sent to an RF, MI, or other transmitter, or an LCD, computer, or other type of device, as indicated at 550 in FIG. 5, for further analysis/processing. The communication between microprocessor 540 and the device or network 550 may comprise a signal or other data transmission by various means such as RF, MI, IR, or wired transmission.

The magnetic induction units in a network configured according to the principles set forth herein may be equipped with both the transmitting and receiving circuits shown and described with reference to FIGS. 3 and 5, respectively. Such magnetic induction units may therefore be capable of two-way communication. Of course, other networks are contemplated in which one or more units are configured with solely transmitter and/or solely receiver circuitry, and are therefore capable of only one-way communication.

In addition to having a programmable frequency output for Frequency-Shift Keying (FSK) modulation, the DDS may be programmed to oscillate at a set frequency while selecting between two different programmable phases, thereby enabling Phase-Shift Keying (PSK) modulation. As another alternative, a constant frequency output of the DDS may be switched on and off, or the amplitude modulated, for Pulse Width Modulation (PWM) or AM modulation transmission, respectively. Any sensor may be interfaced to the transmitter by any suitable method available to one of ordinary skill in the art. The output of the receiver can be connected to any device using a serial interface or other suitable connection. In some embodiments, the units may be configured to run from the power generated by one or more cell batteries. As mentioned above, the units may also be configured with a "sleep" function, which allows for power savings by shutting down all unnecessary circuitry periodically when not in use.

One of ordinary skill in the art will readily develop alternative circuit configurations for implementing devices with functionality similar to those described herein. The examples set forth herein are therefore provided for demonstrational purposes only, and the scope of the invention should not be limited to the details of these preferred embodiments.

The components needed to construct a suitable MI device according to the general principles set forth herein can be combined on an integrated circuit (IC) or semiconductor chip if desired. The magnetic transmitting and receiving coils may also, or alternatively, be an RFID-style integrated coil for further circuit miniaturization. All such miniaturizations and modifications are within the scope of the invention.

In one specific example of a system according to the invention, wireless communication may be established in an underground wireless sensor network. One or more units, capable of one- and/or two-way transmission, may be equipped with buried sensors which collect data. For example, the sensors may be configured to detect soil properties, such as soil moisture content. Such a network can be used, for example, in agriculture to control irrigation. Each unit may be configured to transmit the gathered data to a nearby unit, which retransmits the data along with additional data it has gathered from another sensor to another nearby unit, until all data reaches a desired central location. The central location may be above or below ground and may, if desired, use a secondary means of communication, such as RF or cabling. As previously alluded to, numerous other applications of a wireless network of magnetic induction units are contemplated. For example, other uses of such a network include:

1. An underground network of pressure, vibration, movement, audio, and/or other sensors for defense and/or monitoring. Such a system would have obvious military applications.

2. An underwater network of sensors for monitoring water properties, water quantity, plant or animal life, and/or underwater living conditions.

3. A network of implanted biomedical sensors which could coordinate the acquisition of certain vital signs or biological conditions. Such a network configuration could allow one sensor which detects a certain problem, such as a high fever or heart condition, for example, to request other sensors to acquire relevant data to assist in problem solving and/or decision making.

4. A network through any medium in which long-range communication is not feasible and/or short-range communication is desirable. For example, a PDA, watch, cell phone, laptop, and PC may all synchronize to each other if within a given transmission range.

Further details regarding the use of an underground network in agriculture are now discussed. In one implementation of such a system, each MI unit in the network is miniaturized in the form of an IC. Each unit may also be equipped with a capacitive or other type of soil moisture sensor with other soil-relevant sensors optionally attached. The units may each be buried at a depth for which soil properties measured will be relevant to the crop to be grown in the field, and units may be positioned adjacent to one another and close enough to one another such that each unit can communicate with at least one other unit in order to form a network. The network may be configured to periodically read soil conditions and relay each sensor's data to a central location, where it may be processed and analyzed. If a certain region of the field is in need of water, an irrigation system connected with the network may be moved, either autonomously or manually, to the identified region such that water can be applied as needed. In this way, field soil conditions can be periodically relayed to a control unit without the need of passing a reader over an area. Resources are thereby only devoted to areas in need, when needed.

In other embodiments, a network of MI devices may not always be needed. For example, single sensor buried in the soil which can wirelessly communicate to the surface may be all that is required for certain soil readings. If machinery must pass over the sensors periodically, such as a tractor or irrigation equipment, it may contain a MI device which acquires the data for each sensor with which it communicates and over which it passes.

The coils contained in MI units provide a method for wireless power transmission which, in some implementations, can supply power to a device or recharge an onboard power supply. In some embodiments, units may be configured to harvest energy sent from a nearby unit or reader which can be used to recharge batteries. Recharging may also be accomplished using other onboard energy harvesting techniques, as those having ordinary skill in the art will appreciate.

Those of ordinary skill in the art will also appreciate that a variety of modulation techniques may be used in implementations of the invention. For example, Frequency-Shift Keying (FSK) modulation, Phase-Shift Keying (PSK) modulation, and/or Amplitude Modulation (AM) may be used to superimpose data from a variable sensed at a particular network node on a magnetic carrier signal. Likewise, a variety of demodulation techniques may be used to demodulate one or more modulated magnetic carrier signals at a base node of the network. For example, in one implementation, the demodulation may comprise counting the peaks of a received modulated magnetic carrier signal over a predetermined period of time with a digital counter and supplying a microcontroller with peak count data for Frequency-Shift Keying (FSK) demodulation. In another implementation, the demodulation may comprise digitizing the received amplitudes of a received modulated magnetic carrier signal with an analog-to-digital converter and supplying a microcontroller with digitized amplitude data for Amplitude Modulation (AM) demodulation.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. The scope of the present invention should, therefore, be determined only by the following claims.

The inventon claimed is:

1. A system for wireless data transmission by magnetic induction, the system comprising:
    a first magnetic induction unit configured to transmit a first data signal by modulation of a time-varying magnetic field, wherein the first magnetic induction unit is positioned within a non-gaseous substance, and wherein the first magnetic induction unit comprises an onboard power source;
    a first sensor, wherein the data contained in the first data signal is obtained from the first sensor;
    a second magnetic induction unit configured to receive the first data signal from the first magnetic induction unit and configured to transmit a second data signal wherein the second data signal comprises data from the first data signal, and;
    a second sensor operatively connected with the second magnetic induction unit wherein the second data signal further comprises appended data received from the second sensor.

2. The system of claim 1, wherein the first magnetic induction unit comprises a first single ferromagnetic coil configured to transmit the data signal in a first direction.

3. The system of claim 2, wherein the first magnetic induction unit further comprises a second single ferromagnetic coil configured to transmit the data signal in a second direction.

4. The system of claim 1, wherein the second magnetic induction unit is configured to transmit the second data signal through a secondary communication technology.

5. The system of claim 4, wherein the secondary communication technology comprises at least one of radiofrequency transmission, infrared transmission, and wired electronic transmission.

6. The system of claim 1, wherein the first magnetic induction unit is positioned underground.

7. The system of claim 1, wherein the second magnetic induction unit is positioned within the non-gaseous substance.

8. The system of claim 1, wherein the non-gaseous substance comprises at least one of soil, rock, water, and biological matter.

9. The system of claim 1, further comprising a digital oscillator for modulation of a magnetic carrier signal.

10. The system of claim 1, wherein the second magnetic induction unit is further configured to demodulate the data signal.

11. The system of claim 1, further comprising a base unit configured to receive and process data from the first and second magnetic induction units.

12. A system for underground wireless data transmission by magnetic induction, the system comprising:
    a plurality of magnetic induction network nodes each configured to send and receive data signals generated by modulating a magnetic carrier signal, wherein the magnetic induction network nodes are positioned underground, and wherein the magnetic induction network nodes each have an onboard power supply; and
    a plurality of soil moisture sensors positioned underground and operatively connected to the plurality of magnetic induction network nodes, wherein at least a subset of the plurality of magnetic induction network nodes are each configured to receive data from at least one of the soil moisture sensors, generate a data signal by modulating a magnetic carrier signal, and transmit the data signal to another magnetic induction network node.

13. The system of claim 12, wherein the magnetic induction network nodes are configured for directional transmission of a data signal.

14. The system of claim 12, further comprising a base unit configured to receive and process data from each of the plurality of magnetic induction network nodes.

15. The system of claim 14, wherein the base unit is further configured to relay the received data to a secondary system.

16. The system of claim 15, wherein the base unit is configured to relay the received data to the secondary system via at least one of a radiofrequency transmission, an infrared transmission, and a wired electronic transmission.

17. The system of claim 12, wherein at least a subset of the magnetic induction network nodes are configured to receive data from an adjacent node, append data to the received data, and transmit the received data and the appended data to another adjacent node.

18. The system of claim 12, further comprising an automated irrigation system operatively connected to the network nodes and configured to distribute water in accordance with data received from the soil moisture sensors.

19. A method for transmitting data signals by magnetic induction, the method comprising:
   sensing a variable at a first node;
   generating a first modulated magnetic carrier signal with data corresponding to the sensed variable;
   transmitting the first modulated magnetic carrier signal to a second node;
   sensing a variable at the second node;
   generating a second modulated magnetic carrier signal with data corresponding to the variable sensed at the second node;
   superimposing data from the variable sensed at the second node on the first modulated magnetic carrier signal by modulation selected from a group consisting of frequency-shift keying (FSK) modulation, phase-shift keying (PSK) modulation, and amplitude modulation (AM); and
   transmitting the second modulated magnetic carrier signal to a base node.

20. The method of claim 19, wherein the step of transmitting the first modulated magnetic carrier signal to the second node comprises transmitting the first modulated magnetic carrier signal in a predetermined direction to the second node.

21. The method of claim 19, wherein the second modulated magnetic carrier signal comprises a modulation of the first modulated magnetic carrier signal.

22. The method of claim 19, wherein a digital oscillator is used to generate the first modulated magnetic carrier signal.

23. The method of claim 19, further comprising demodulating the second modulated magnetic carrier signal at the base node.

24. The method of claim 23, wherein the second modulated magnetic carrier signal is demodulated with a microcontroller.

25. The method of claim 24, wherein the step of demodulating the second modulated magnetic carrier signal comprises:
   counting the peaks of the second modulated magnetic carrier signal over a predetermined period of time with a digital counter; and
   supplying the microcontroller with peak count data for Frequency-Shift Keying (FSK) demodulation.

26. The method of claim 24, wherein the step of demodulating the second modulated magnetic carrier signal comprises:
   digitizing the received amplitudes of the second modulated magnetic carrier signal with an analog-to-digital converter; and
   supplying the microcontroller with digitized amplitude data for Amplitude Modulation (AM) demodulation.

27. The method of claim 19, wherein the step of transmitting the first modulated magnetic carrier signal to a second node comprises transmitting the first modulated magnetic carrier signal underground to the second node.

28. The method of claim 27, wherein the variable comprises soil moisture content.

* * * * *